April 19, 1955     G. T. KODAMA     2,706,798
ELECTRICAL CAPACITOR
Filed March 8, 1951
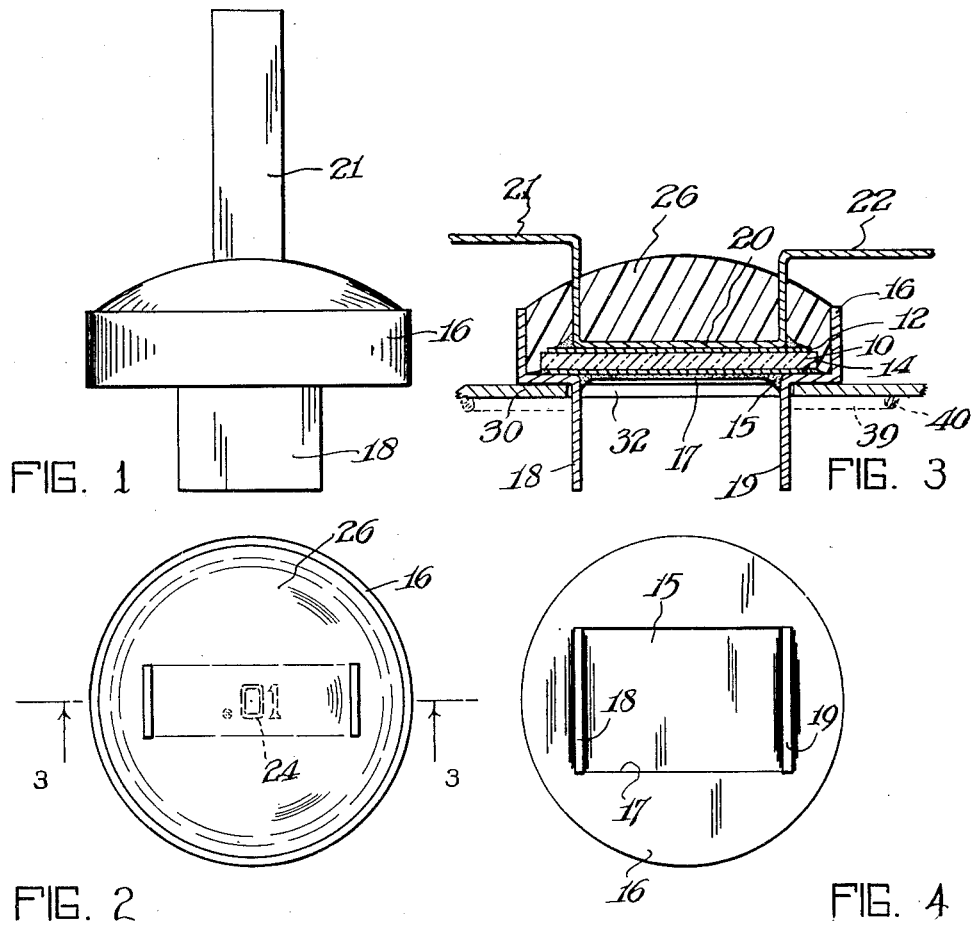
INVENTOR.
GEORGE T. KODAMA
BY
*HIS ATTORNEY.*

United States Patent Office 2,706,798
Patented Apr. 19, 1955

2,706,798

ELECTRICAL CAPACITOR

George T. Kodama, Dunstable, Mass., assignor to Sprague Electric Company, North Adams, Mass., a corporation of Massachusetts Application March 8, 1951, Serial No. 214,491

1 Claim. (Cl. 317—242)

This invention relates to electric capacitors, and particularly to such capacitors than can be speedily and readily connected in a circuit.

Among the objects of the present invention is the provision of a high frequency capacitor that can be very easily mounted on a support such as a circuit-carrying chassis.

The above as well as additional objects of the present invention will be more completely understood from the following description of several of its exemplifications, reference being made to the accompanying drawings wherein:

Figs. 1 and 2 are side and plan views respectively of one form of capacitor according to the present invention;

Fig. 3 is a sectional view of the capacitor of Fig. 1, taken along the line 3—3, and with the capacitor shown in relation to the support in which it is mounted.

Fig. 4 is a bottom view of the capacitor of Figs. 1 and 2.

According to the present invention, a highly practical and convenient capacitor unit has been developed by fixing the essential elements of a capacitor in a shallow metal cup having a cut-out tongue for engagement in a slot in a support member. The tongue can be manually deformable for simple engagement in the slotted support, and can be solderable to provide a very effective final solder anchorage. In addition, the tongue can be connected as a terminal lead of the capacitor so that one lead connection is automatically completed when the mounting is effected.

The capacitor is found to possess excellent high frequency characteristics when the electrode element at the open end of the metal cup is provided with a terminal element comprising an elongated metal tab fastened to said electrode at a central portion of said tab.

Referring to the figures, a capacitor dielectric in the form of a disc 10 is shown as having electrodes 12, 14 coated on its opposed faces. One electrode 14 is secured as by solder 15 against the inner surface of a cup-shaped holder 16 which is provided with a pair of tongues 18, 19, struck out from the bottom of the cup. This electrode can be positioned so that the above soldering operation seals the opening or struck out portion 17 of the cup bottom.

To the other electrode 12 is secured as by soldering a terminal tab 20 having two projecting ends 21, 22. This dual terminal arrangement permits circuit connection with lowest possible series inductance and optimum high frequency characteristics. A single terminal wire or tab can be used successfully at low frequencies. The secured section of the tab is preferably made relatively long to provide an electrode-contacting surface large enough to establish a firm support. For simpler short-path connection in a circuit the tab ends are made easily pliable and may be tinned for soldering. One end of the tab serves as input and the other as output terminal in a high frequency circuit, the metal cup being grounded. As shown in Fig. 2, at 24, the tab may also carry indicia to identify the different capacitances and the operating limitations for which the unit is designed. These indicia may conveniently be stamped or printed on the outwardly facing central section of the tab or the ends.

Where it is desired to protect the capacitor from external influences such as atmospheric moisture and handling, the dielectric 10 and its electrodes 12, 14 can be covered by suitable dielectric coatings or sealing compound. In the embodiment shown, the cup 16 is filled with a resin 26 which is introduced as a liquid or paste and then hardened as by thermal curing. One very suitable protecting material is the cross-linked epoxyline type of resin available under the trade names "Epon" and "Araldite."

The epoxyline resins may be cross-linked with acid or alkaline catalysts. They may also be used in conjunction with other resins, such as the formaldehyde type condensation resins, alkyd resins, etc. These resins are of the so-called casting type and can be fully cured to show very good adhesion to metals without the use of pressure and without an undue amount of shrinkage.

Other suitable protecting materials are the polyester-styrene copolymers of the type described in Ellis Patent No. 2,255,313 granted September 8, 1941. Diallyl phthalate resins, thermoplastic resins in general and high temperature waxes can also be used. All these can be cast directly in place and do not require the application of mechanical pressure for the desired curing. If desired, however, other protective materials such as phenolic, alkyd, acrylic, melamine-aldehyde and cellulosic resins can be applied either to fill the cup 16 or as relatively thin coatings over the dielectric 10 and its electrodes.

Fillers, as for example talc, finely ground silica and colored oxides, can also be incorporated in the protective compound 26. Although they would render the resin opaque so that the indicia 24 could not be read, fillers reduce the cost of the protecting mixture and also reduce its thermal expansion, thereby improving its sealing properties under varying temperatures. In addition, the fillers can be used to distinctively color the sealing compound and thereby serve as indicia.

The capacitor dielectric 10 can be of any desired type. For capacitances as high as 0.01 microfarad for 400 volt operation, in a cup having a diameter of about 5/8 inch and a depth of about 40 to 50 mils, a barium strontium titanate (20% to 30% barium titanate) ceramic disc having a dielectric constant of about 3500 and a thickness of 10 to 15 mils is a very effective dielectric. The disc can be provided with fired-on silver electrode coatings on its opposed faces in the conventional manner and one silver coating 14 is soldered or sweated against the bottom of the cup. The tab 20 can also be soldered in place against the other electrode at the same time, or if desired in a preliminary or subsequent treatment. The protective compound 26 is then applied and cured to complete the preparation.

Other capacitor dielectrics can also be used, particularly for the lower capacitances. Thus for example, titanium dioxide plates, glass or mica sheets, filled or unfilled resins such as polytetrafluoroethylene or styrene-divinyl benzene copolymers are satisfactory. Capacitor dielectrics of thermosetting or high temperature thermoplastic resins are preferred where they are subjected to soldering or other high temperature treatments.

The electrodes 12, 14 need not be adherently united coatings on the capacitor dielectric, but can be foils or coating strata clamped in place by the sealing compound 26, the tab 20 acting as a temporary positioning and holding means during the hardening or curing of this compound. In this form of the invention the cup 16 can be provided with a turned in upper lip to more securely anchor the capacitor elements in place by means of the covering protecting compound.

According to the present invention, the capacitor can also be of the stacked type having more than one dielectric sheet either adherently united into one assembly as by soldering their electrode faces on both sides of intermediate foils, or clamped together by the sealing compound as above indicated. The intermediate foils can be connected to the proper capacitor terminals as by projecting portions which extend up through the sealing compound and are externally soldered in place.

According to a modified form of the invention, more than one capacitance can be provided as by using separate dielectric plates fixed side-by-side in cup 16. Some of the electrodes of the separate plates may be interconnected and one or more leads can project out like the tab 20. Alternatively a single capacitor dielectric can be provided with three or more separate electrodes to provide separate capacitance sections.

The tab 20 can, if desired, be made relatively rigid. The rigid form is more easily connected in a circuit when the capacitor is mounted since it holds itself securely in place against the pressure of an applied soldering iron or other connecting implement. On the other hand, a pliable tab can be made longer and be used to carry identification marks without danger of their being obscured by a soldered connection. According to a limited embodiment of the invention, a single tab end may be used with each ungrounded terminal lead. However, as previously indicated, the dual-ended tab provides a feed-through or feed-across type of capacitor connection in which the electrical distance from the feed-through circuit to ground (the cup, or chassis to which it is secured) is very small and the by-passing impedance thereby greatly reduced, and this embodiment is preferred in accordance with the invention.

Figure 3 shows one convenient technique for mounting the capacitor of the present invention. A plate 30, such as the metal base of a chassis carrying an electrical circuit, is provided as by punching with a slot 32 large enough to receive both tongues 18, 19. The capacitor is then inserted in place as shown, and one or both tongues bent back against the under side of plate 30 in the manner indicated by the dash lines 39. By making the tongue or tongues manually deformable, this bending operation is readily accomplished without the use of any tools. If it is desired to more firmly fix the anchorage, the clamping tongue can be soldered in place as indicated at 40. For this purpose the tongues may be made of readily solderable material as by being provided with a tinned surface.

In accordance with the present invention it is not necessary to use more than a single tongue per capacitor, but 3 or more tongues can also be provided without unduly complicating the construction. All the tongues can, in fact, be struck out from the cup 16 by a single stamping operation. A plurality of tongues is preferred, inasmuch as only one of the tongues need be bent back and soldered in place, while the other tongues will bring and hold the unit in the desired position.

According to a further phase of the present invention, the mounting tongues can also be provided with detents or friction catches, and can be of a relatively rigid construction. In this arrangement the detents or catches can be positioned to automatically latch and hold the tongue anchored in a slot through which it is inserted.

As many apparently widely different embodiments of this invention may be made without departing from the spirit and scope hereof, it is to be understood that the invention is not limited to the specific embodiment hereof, except as defined in the appended claim. Thus the anchoring tongues of the invention are very effective with cups having a minimum width of about ½ inch. Furthermore, the shape of the cup in plan view may be of any style, e. g. circular, square, rectangular, polygonal.

What is claimed is:

In a quick-mounting grounding capacitor, a shallow sheet metal cup imperforate except for an opening in the cup bottom, at least one yieldable metal mounting tab integral with and projecting out from said cup at the edge of said opening, a dielectric disc positioned in said cup above and completely covering said opening, a first conducting electrode adherently held upon the lower face of said disc and also completely covering said opening, said electrode being soldered to the bottom of said cup completely around said opening and sealing the bottom of the disk, a second conducting electrode adherently held on the opposite face of said disc, a terminal having one portion projecting out of the cup with another portion positioned within said cup and secured to said second electrode, and a substantially moisture-proof insulating and protective resin filling the cup and covering and sealing the entire dielectric along with the second electrode and the contacting portion of the terminal.

References Cited in the file of this patent

UNITED STATES PATENTS

| 2,348,693 | Minnium | May 9, 1944 |
| 2,436,208 | Dressel | Feb. 17, 1948 |

FOREIGN PATENTS

| 509,340 | Great Britain | July 14, 1939 |

OTHER REFERENCES

Harvey et al.: Abstract of application Serial No. 659,232, published April 25, 1950, in 634 O. G. 311.

"Erie Button Silver Mica Condensers," Catalog page of Erie Resistor Corp. Received U. S. Patent Office July 3, 1945.